United States Patent [19]
Seefluth

[11] 3,985,850
[45] Oct. 12, 1976

[54] ADJUSTING PARISON ALIGNMENT BY TEMPERATURE CONTROL OF PICKER FINGER

[75] Inventor: Charles L. Seefluth, Bartlesville, Okla.

[73] Assignee: Phillips Petroleum Company, Bartlesville, Okla.

[22] Filed: May 29, 1975

[21] Appl. No.: 581,615

[52] U.S. Cl. .............................. 264/98; 29/200 P; 29/407; 264/89; 264/327; 425/DIG. 208; 425/DIG. 213; 425/DIG. 216
[51] Int. Cl.² ........................................ B29C 17/07
[58] Field of Search .................. 264/89, 94, 98, 99, 264/327; 425/DIG. 208, DIG. 213, DIG. 216; 29/200 P, 407

[56] References Cited
UNITED STATES PATENTS

| | | | |
|---|---|---|---|
| 3,125,619 | 3/1964 | Miller | 264/327 X |
| 3,229,006 | 1/1966 | Nohl | 264/98 |
| 3,758,254 | 9/1973 | Dean | 425/387 B |

*Primary Examiner*—Jan H. Silbaugh

[57] ABSTRACT

An open end parison preform is heated to molding temperature preparatory to transfer to a molding station. The thus heated parison is grasped by a pair of opposed picker fingers and transferred into position over a neck forming plug. The relative temperature of the opposed picker fingers is controlled which effects the alignment of the bottom end of the parison over the plug.

5 Claims, 4 Drawing Figures

ADJUSTING PARISON ALIGNMENT BY TEMPERATURE CONTROL OF PICKER FINGER

BACKGROUND OF THE INVENTION

This invention relates to transferring a parison preform from a heating station into position over a plug in a molding station.

Blow molding hollow articles such as bottles and the like from reheated parison preforms so as to take advantage of the strengthening effect of molecular orientation is known in the art. Exemplary of such art is Wiley et al., U.S. Pat. No. 3,507,005. Inherent in such a molding technique is the necessity for transferring parisons from a heating means to a molding station. In laboratory or development scale equipment this can easily be accomplished either by hand or by mechanical means such as is shown in said Wiley et al patent. However, for such techniques to be competitive on a commercial scale it is necessary to reduce cycle time to a minimum, and insure virtually perfect reproducibility so that each article will be perfectly formed, thus keeping rejects to a minimum. One problem in this area is accurate alignment of the parison in the molding zone, particularly when carrying out the operation at a speed sufficiently high to be commercially feasible.

SUMMARY OF THE INVENTION

It is an object of this invention to make possible the production of bottles and the like, from reheated parisons, at high production rates;

and it is yet a further object of this invention to reduce rejects and imperfectly formed bottles due to poor positioning of the parison in the molding station.

In accordance with this invention a vertically disposed open end tubular parison is grasped at the upper end thereof by a pair of opposed picker fingers which press the opposed walls of this open end together preparatory to transfer into position over a thread forming plug, means being provided to selectively adjust the temperature of the picker fingers.

BRIEF DESCRIPTION OF THE DRAWINGS

In the drawings, forming a part thereof, wherein like reference characters denote like parts in the various views.

DESCRIPTION OF THE PREFERRED EMBODIMENTS

Figure 1:
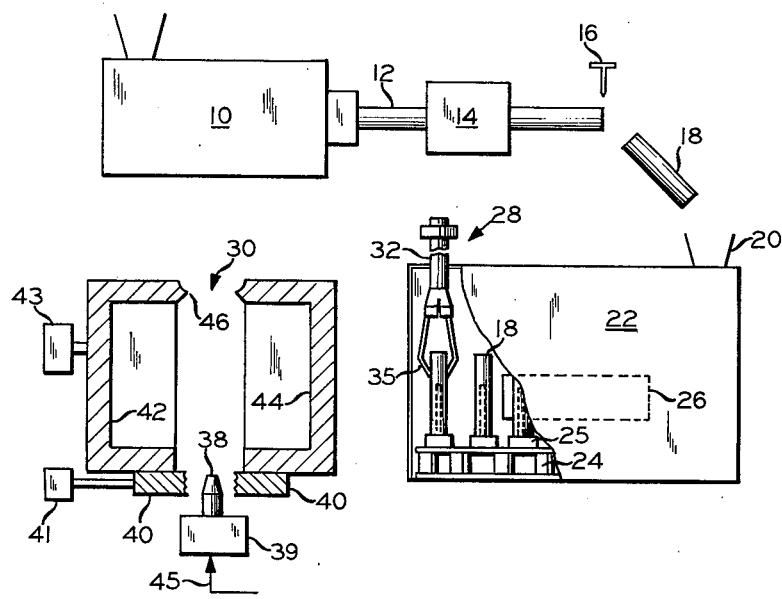
FIG. 1 is a side elevation with parts cut away of a blow molding apparatus having a parison transfer mechanism in accordance with the invention.

The apparatus of this invention can be utilized in the blow molding of any type of hollow article from a tubular parison preform. Primarily, it is of utility in the forming of biaxially oriented hollow articles such as bottles from parison preforms which have been reheated to orientation temperature.

It has been found surprisingly that if the open bottom end of the parison is not positioned exactly over the neck forming plug or if the alignment shifts during continuous operation, it can be brought into alignment by making the temperature of one of the fingers cooler than the other. Specifically, the bottom of the parison shifts toward the finger that is being cooled or away from the finger being heated.

By orientation temperature it is meant that temperature at which a polymer on stretching exhibits an increase in strength. For crystalline polymers, this is generally in the range of 1° to 50° F (0.6°–28° C), preferably 10° to 30° F (6°–17° C), below the crystalline melting point. For amorphous polymers the temperature is generally within the range of 40° to 225° F (22°–126° C), preferably 100° to 175° F (56°–98° C), below the homogeneous melt point.

While the molding operating itself is generally carried out at ambient temperature, the sequence of steps is sufficiently rapid that the parison remains at orientation temperature during the molding.

Exemplary crystalline polymers are polymers and copolymers of at least one mono-1-olefin having 2 to 8 carbon atoms per molecule, preferably polypropylene. Exemplary of amorphous polymers are polyvinylidene chloride, polystyrene, styrene/acrylonitrile/methacrylonitrile copolymers, various styrene/butadiene-containing resins and the like.

Preferably, the transfer means is carried by a shaft riding on ball bearing splines. These ball bearing splines are commercially available, for instance, from Saginaw Steering Gear Division of General Motors Corporation, as disclosed in U.S. Pat. No. 3,758,254, the disclosure of which is hereby incorporated by reference.

The advantages of the invention are intimately associated with molding wherein the article to be formed, in the instance of a bottle, is in an upside-down position with the lower open end of the parison being placed over a neck-forming plug and the upper end being sealed and severed by the leading edges of bottom wall forming members of the mold. That is, by bottom wall forming members it is meant the upper members of the mold which form the bottom wall of the bottle.

It is particularly advantageous in the operation of this system for the parison to be preblown slightly prior to closing of the mold on it to effect sealing. Since the upper open end of the parison is already closed off as a result of being flattened by the picker fingers, air or other blow fluid can be introduced through the thread forming plug. In the preferred embodiments where the parison is at orientation temperature, the preblow fluid must be introduced under a greater pressure than the 3 to 6 psi (20.7 × $10^5$ to 41.5 × $10^3$ pascals) normally used for preblowing conventional blow molding operations in which hot extruded parisons are used. Preblow pressure of at least 25 psig (17.2 × $10^4$ pascals gage) is preferred with a range of 25 to 50 psig (17.2 × $10^4$ to 34.5 × $10^4$ pascals gage) being entirely satisfactory. However, it has been found that by controlling the rate of introduction or the timing of the preblow introduction, the same source of fluid can be used in the preblow which is utilized in the main blow. For instance, fluid under the full pressure (80 to 150 psig (55.2 × $10^4$ to 103 × $10^4$ pascals gage), for instance) can be admitted to preblow the parison just as the mold halves begin to close; without ever interrupting the flow the parison will be preblown just as the molds close and thereafter the fluid pressure expands the parison into conformity with the mold. The parison will undergo slight radial expansion as a result of the introduction of the preblow fluid.

It is preferred when operating with parisons at orientation temperature that the mold halves have leading edges contoured so as to have a severing edge which is the furthermost extension thereof, this severing edge cooperates with a matching edge on the opposing mold half to sever the parison. Preferably, these edges are disposed so as to project past a theoretical center line between the two mold parts a distance of 0.5 to 5 mils ($1.3 \times 10^{-5}$ to $13 \times 10^{-5}$ meters), preferably 1 to 4, mils ($2.5 \times 10^{-5}$ to $10 \times 10^{-5}$ meters). Adjacent a bottle wall forming portion of the sealing and severing section of the mold halves is a second projection which cooperates with a matching projection on the opposing mold half to hold said thus severed parison within a bead forming cavity, to be described hereinbelow. For use with parisons having a wall thickness of 75 to 225 mils ($190 \times 10^{-5}$ to $571 \times 10^{-5}$ meters), a leading edge of these holding projections preferably has a land height of 5 to 16 ($13 \times 10^{-5}$ to $41 \times 10^{-5}$ meters), preferably 8 to 12 ($20 \times 10^{-5}$ to $30 \times 10^{-5}$ meters), mils. Between the holding projection and the severing edge of each sealing and severing means is a small cavity which, in cooperation with a matching cavity on the other mold half, forms a bead forming mold. Preferably, this cavity has a circular configuration although other configurations can also be used. This cavity preferably has a maximum lateral dimension of 15 to 25 percent of the combined thickness of the two walls of the parison prior to stretching. For parisons having a wall thickness before stretching of 150 mils ($381 \times 10^{-5}$ meters), a maximum lateral dimension of this cavity of 45 to 75 mils ($114 \times 10^{-5}$ to 190 to $10^{-5}$ meters) is satisfactory.

While it is not essential to the invention, it is highly preferred that the sealing and severing means have surfaces sloping back from the severing edge on the side opposite said bead-forming cavity at an angle such that the included angle of the opposed surfaces when the mold parts are in the closed position is within the range of 15° to 100°, preferably 25° to 90°, more preferably 30° to 45°. In this way lateral pressure on the tail portion of the parison which is being severed has a vertical component force which is sufficient to cause the severed tail portion to fall free from the portion of the parison held within the bead-forming cavity.

A "V" or other recess can be machined into the outer surface of the bottom wall forming a portion of the mold at right angles to the parting line to accommodate the lowermost extensions of the picker fingers so as to allow the parison to be sealed and severed closer to the point at which it is held in the picker fingers to thus minimize regrind.

The parison heating means can be any suitable means for heating parison preforms such as an air oven, a radiant heating chamber or the like which can be utilized to heat the parisons and deliver them, preferably at orientation temperature, in a vertical position to a picker station.

By utilizing the technique of said U.S Pat. No. 3,758,254, whereby said picker fingers flatten the top end of said parisons and then move so as to align this flattened end perpendicular to a parting line of the mold halves so as to align the upper end of the parison (the bottom end of the article), and the technique of this invention to align the bottom end of the parison over the neck-forming plug, the parison is aligned properly at both ends.

Referring now to the drawings, particularly FIG. 1, there is shown a schematic representation of a blow molding operation utilizing the instant invention. Extruder 10 forms a tubular extrudate 12 which passes to cooling and sizing zone 14 and thence to cutting means 16 where it is cut into individual open end parison preforms 18 which fall into loading hopper 20 of oven 22. Oven 22 is a circulating air oven having a continuous chain 24 with spaced parison support means 25 for conveying parisons 18 therethrough in an upright manner. Radiant heaters 26 provide supplemental heat to aid in more quickly and uniformly heating the parisons to orientation temperature.

Parison transfer mechanism generally designated by reference character 28 transfers the parisons from oven 22 to the molding station generally designated by reference character 30. The construction of transfer mechanism 28 will be described in greater detail hereinbelow. At the point in the cycle depicted in FIG. 1, gripping means designated generally by reference character 32 has grasped the outer (upper) end of the parison by means of picker fingers 35. Ball bearing spline shaft 34 attached to arm 36 (see FIG. 2) which carries gripping means 32 is raised axially upward so as to lift parison 18 out of the oven. Thereafter shaft 34 rotates about its axis moving parison 18 in an arc stopping with parison 18 positioned generally above thread-forming plug 38. Shaft 34 is then lowered to position the bottom open end of parison 18 over said plug. Thread-forming jaws 40 then close and optionally plug 38 is advanced axially upward an additional distance into the open end of said parison to thus form the thread and/or neck area. Ball spline shaft 34 then moves axially upward again thus stretching the parison between thread forming jaws 40 and picker fingers 35. This stretching operation terminates just as the picker fingers clear above the top of mold halves 42 and 44. Mold halves 42 and 44 then converge with leading edges 46 of said mold halves severing the parison which is sealed adjacent thereto. The alignment of the picker fingers 35 carried by transfer mechanism 28 is such that as the mold halves are closing, the parison, to the extent that it is tilted along a plane parallel to the longitudinal direction of clamp members 35 is straightened up by the closing action of the mold halves because the longitudinal direction of the clamp members 35 as they are disposed above mold halves 42 and 44 is at right angles to the parting line thereof. Fluid pressure is then introduced via line 45 to expand said parison into conformity with the mold cavity to form a biaxially oriented bottle. During this time, shaft 34 is rotated to position means 32 over a scrap receiving means 49 whereupon picker fingers 35 of means 32 open up to deposit the severed end of parison 18. Rotation of the shaft 34 is continued until means 32, with the picker fingers 35 is an open position, is again placed over a parison in oven 22 whereupon shaft 34 descends and picker fingers 35 of means 32 close on the parison. The mold halves then open and the thus formed bottle is removed. By this time transfer mechanism 28 has the next parison ready for positioning over plug 38.

Plug 38 is moved axially upward and downward by means of cylinder 39. Jaw means 40 are moved into and out of engagement by means of cylinder 41 and mold halves 42 and 44 are opened and closed by means of air cylinders 43. Air is introduced into the interior of the parison to effect expansion of same via line 45 which feeds into a hollow core of plug 38.

Figure 2:
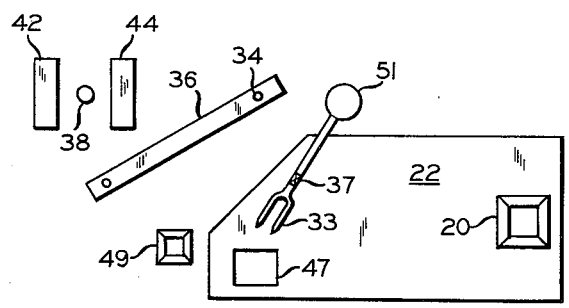
FIG. 2 is a plan view of the entire blow molding apparatus showing the relationship of the transfer means to the temperature adjustment means and the molding station.

Referring now to FIG. 2, there is shown in simple schematic form a plan view depicting the relationship of the various elements as arm 36 carrying gripping means 32 moves from discharge means 47 at the oven picker station, toward a position over plug 38. Also there is shown scrap chute 49 into which the cut off portion of the parison is deposited on the return of arm 36 into position over discharge means 47. Air jets 33 controlled by valve 37 direct cooling or heating fluid onto one or the other of the two picker fingers so as to selectively cool or heat one relative to the other. Tank 51 is depicted as a source of fluid.

Figure 3:
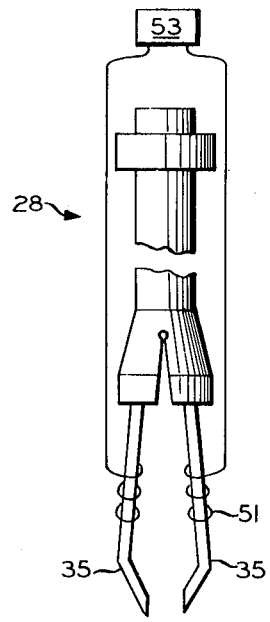
FIG. 3 is a detailed view of the picker fingers.

FIG. 3 shows picker fingers 35 of transfer mechanism 28 having heating means 51 connected to controller 53. In this way controller 53 can be set to heat one or the other of the fingers, either alone or in conjunction with cooling of the other finger. Alternatively, the sole means of temperature control can be the cooling as depicted in FIG. 2.

Figure 4:
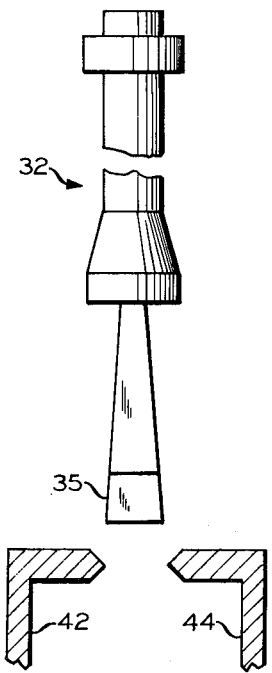
FIG. 4 is a view showing the relationship of picker fingers to the mold.

FIG. 4 shows the longitudinal direction of the picker fingers 35 to be perpendicular to a parting line of the mold cavity formed by mold halves 42 and 44.

EXAMPLE

Propylene homopolymer having a density of 0.905 g/cc (ASTM D 1505–63T), and a melt flow of 2 (ASTM D 1238–62T, Condition L), and a melting point of about 340° F (171° C) was extruded into tubing having an outside diameter of 0.9 inch ($2.3 \times 10^{-2}$ meters) and a wall thickness of 0.150 inch ($0.38 \times 10^{-2}$ meters). The tubing was cooled to room temperature in a vacuum sizing and quenching chamber then cut into 7-inch lengths ($18 \times 10^{-2}$ meters). These 7-inch lengths were placed on vertically disposed pins carried by a continuous chain within a circulating air oven and passed through said oven. Supplementary heat was imparted by radiant panel heaters. The lengths were heated to a temperature of 320° F (160° C). A mechanism essentially identical to that shown in the drawings, lifted the lengths axially out of the oven and transferred them through an arc and into position directly over a thread forming plug identical to that shown in the drawings and descended to place the lower end of the parison over said plug. Thread-forming jaws then closed on the parison, the plug was moved axially upward a short distance, the gripping means was raised to stretch the parison so that the portion between the thread-forming jaws and clamp members of the gripping means was stretched to approximately twice its original length. Thereafter preblow air at a pressure of 50 psig ($34.5 \times 10^4$ pascals gage) was introduced into the interior of the parison to give a slight radial expansion to the parison. Thereafter mold halves were closed on the parison, said parison being disposed so that the longitudinal direction of said flattened end was at right angles to the parting line of said mold halves, the upper portion of said mold halves having a configuration including a bead-forming cavity which produced a tab at the seal area, said upper portion of said mold halves also having a blade means which pinched the parison off adjacent said tab. Thereafter blow air was introduced to expand the parison out into complete conformity with the mold cavity. The parison transfer arm was rotated to a position over a scrap receiving means and the gripping means tongs opened to release the severed upper end of the parison. The mold cavity was then opened and the bottle ejected by blowing additional air through the plug. During the course of operation, the parisons began to shift from perfect alignment over the plug. Air was then blown onto the finger on the side opposite the direction the parison was tilted to cool this finger and the perfect alignment was regained. In another run, the finger on the side opposite the direction the bottom of the parison was shifted was wiped with a wet rag and the subsequent parisons were transferred exactly into alignment over the plug.

While this invention has been described in detail for the purpose of illustration, it is not to be construed as limited thereby but is intended to cover all changes and modifications within the spirit and scope thereof.

I claim:

1. In a method of forming biaxially oriented hollow articles comprising in combination, heating an oriented open end thermoplastic parison to orientation temperatures;

grasping an upper end of said parison with opposed picker fingers;

transferring said parison into position with a bottom end thereof over a neck forming plug; and longitudinally stretching and expanding said parison while at said orientation temperature, the improvement comprising correcting misalignment of said parison relative to said plug by adjusting a temperature of a finger on a side opposite a direction said bottom end of said parison is shifted away from said plug to a lower temperature than a temperature of the other finger.

2. A method according to claim 1 wherein a cool fluid is blown onto said finger on said side opposite said direction said parison is shifted.

3. A method according to claim 1 wherein a finger on a side toward which said parison is shifted is heated.

4. A method according to claim 1 wherein said thermoplastic is polypropylene.

5. A method according to claim 1 wherein said grasping of said parison is done so as to flatten said thus grasped end and on transfer of said parison to said position over said plug said flattened end is perpendicular to a parting line of mold halves which form a mold cavity around said parison.

* * * * *